United States Patent
Kimura (10) Patent No.: US 9,588,313 B2
(45) Date of Patent: Mar. 7, 2017

(54) OPTICAL DEVICE PACKAGE AND OPTICAL DEVICE APPARATUS

(71) Applicant: SHINKO ELECTRIC INDUSTRIES CO., LTD., Nagano-shi, Nagano (JP)

(72) Inventor: Yasuyuki Kimura, Nagano (JP)

(73) Assignee: SHINKO ELECTRIC INDUSTRIES CO., LTD., Nagano-Shi (JP)

( * ) Notice: Subject to any disclaimer, the term of this patent is extended or adjusted under 35 U.S.C. 154(b) by 0 days.

(21) Appl. No.: 15/083,948

(22) Filed: Mar. 29, 2016

(65) Prior Publication Data

US 2016/0291266 A1   Oct. 6, 2016

(30) Foreign Application Priority Data

Apr. 1, 2015 (JP) ................................. 2015-075271

(51) Int. Cl.
*G02B 6/36* (2006.01)
*G02B 6/42* (2006.01)

(52) U.S. Cl.
CPC .......... *G02B 6/428* (2013.01); *G02B 6/4204* (2013.01)

(58) Field of Classification Search
CPC .. G02B 6/4257; G02B 6/4244; G02B 6/4245; G02B 6/4219; G02B 6/4236; H05K 2201/10121; H01S 5/02256; B32B 38/0004
USPC .................................................. 385/88–92
See application file for complete search history.

(56) References Cited

U.S. PATENT DOCUMENTS

| | | | | |
|---|---|---|---|---|
| 6,416,238 B1 * | 7/2002 | Gilliland | .............. | G02B 6/4249 385/88 |
| 6,586,678 B1 * | 7/2003 | Rosenberg | .......... | H01S 5/02212 174/520 |
| 6,707,073 B1 * | 3/2004 | Yamamoto | .......... | H01S 5/02212 257/100 |
| 6,868,104 B2 * | 3/2005 | Stewart | ............... | H01S 5/02212 372/36 |
| 7,061,949 B1 * | 6/2006 | Zhou | .................. | H01S 5/02296 372/36 |
| 7,210,859 B2 * | 5/2007 | Kumar | ................ | H01S 5/02212 257/E23.19 |
| 7,218,657 B2 * | 5/2007 | Kihara | ................ | H01S 5/02212 372/29.015 |
| 7,837,398 B2 * | 11/2010 | Sato | .................... | H01S 5/02212 385/92 |
| 8,260,097 B2 * | 9/2012 | Meadowcroft | ...... | G02B 6/4204 385/14 |
| 2009/0135864 A1 | 5/2009 | Aruga | | |

FOREIGN PATENT DOCUMENTS

| | | |
|---|---|---|
| JP | 8-18165 | 1/1996 |
| JP | 2005-191088 | 7/2005 |
| JP | 2009-130263 | 6/2009 |

* cited by examiner

*Primary Examiner* — Ellen Kim
(74) *Attorney, Agent, or Firm* — Rankin, Hill & Clark LLP (57) ABSTRACT

An optical device package includes a metal base body including a cutout portion formed from an outer circumferential surface of the metal base body toward the center portion thereof, and a wiring board connected on a side surface of the cutout portion of the metal base body. The wiring board includes an optical device mounting region provided on a portion of the wiring board located inside the cutout portion of the metal base body, and a pad arranged on a portion of the wiring board located outside the optical device mounting region.

9 Claims, 7 Drawing Sheets

FIG. 4B (ENLARGED SECTIONAL VIEW)

OPTICAL DEVICE PACKAGE AND OPTICAL DEVICE APPARATUS

CROSS-REFERENCE TO RELATED APPLICATION

The present application claims priority from Japanese Patent Application No. 2015-075271 filed on Apr. 1, 2015, the entire content of which is incorporated herein by reference.

BACKGROUND

Technical Field

The present invention relates to an optical device package and an optical device apparatus.

Related Art

In general, an optical device header on which a light emitting element or a light receiving element is mounted is known. In a related-art optical device header, leads are provided to be sealed on a circular disk-shaped metal eyelet with glass.

A light emitting device and a light receiving element for monitoring light therefrom are mounted on device mounting portions of the eyelet and then a cap, which is provided with a transparent glass window on the center portion thereof, is attached on the eyelet, so that the light emitting device and the light receiving element are air-tightly sealed.

Patent Document 1: Japanese Patent Application Publication No. H8-18165

Patent Document 2: Japanese Patent Application Publication No. 2005-191088

Patent Document 3: Japanese Patent Application Publication No. 2009-130263

As described below with respect to a preliminary matter, in the optical device header in which leads are sealed on the eyelet with glass, a length of gold wires for connecting semiconductor laser device to leads is long and thus transmission loss in a transmission path thereof is increased. Accordingly, there is a problem in that conformity in characteristic impedance of the entire transmission path cannot be achieved.

SUMMARY

Exemplary embodiments of the invention provide an optical device package and an optical device apparatus having a structure which can achieve conformity in characteristic impedance of the entire transmission path.

An optical device package according to an exemplary embodiment, comprises:

a metal base body comprising a cutout portion formed from an outer circumferential surface of the metal base body toward the center portion thereof; and a wiring board connected on a side surface of the cutout portion of the metal base body, the wiring board comprising an optical device mounting region provided on a portion of the wiring board located inside the cutout portion of the metal base body, and a pad arranged on a portion of the wiring board located outside the optical device mounting region.

An optical device apparatus according to an exemplary embodiment, comprises:

an optical device package comprising:

a metal base body including a cutout portion formed from an outer circumferential surface of the metal base body toward the center portion thereof, and a wiring board connected on a side surface of the cutout portion of the metal base body, the wring board including an optical device mounting region provided on a portion of the wiring board located inside the cutout portion of the metal base body, and a pad arranged on a portion of the wiring board located outside the optical device mounting region;

an optical device mounted on the optical device mounting region of the wiring board of the optical device package; and a wire connecting the optical device to the pad.

According to the following disclosure, the optical device package is configured so that the cutout portion is formed from an outer circumferential surface of the metal base body toward the center portion thereof and also the wiring board is connected on the side surface of the cutout portion of the metal base body.

The optical device mounting region is provided on a portion of the wiring board located inside the cutout portion of the metal base body, and the pad is arranged on a portion of the wiring board located outside the optical device mounting region.

An optical device mounted on the optical device mounting region is connected to the pad by wires. The pad can be formed by patterning a copper foil or the like on the basis of photolithography. The optical device mounting region and the pad can be arranged to be sufficiently close to each other.

Thus, wires for connecting the optical device to the pad can have a shorted length, thereby reducing transmission loss in the transmission path and thus achieving conformity in characteristic impedance of the entire transmission path.

Also, a complicated process for sealing leads on through-holes of the eyelet with glass can be eliminated. Accordingly, the number of components can be reduced and also the assembling process can be simplified, thereby achieving reduction of manufacturing costs.

DETAILED DESCRIPTION

Hereinafter, embodiments will be described with reference to the accompanying drawings.

Figure 1:
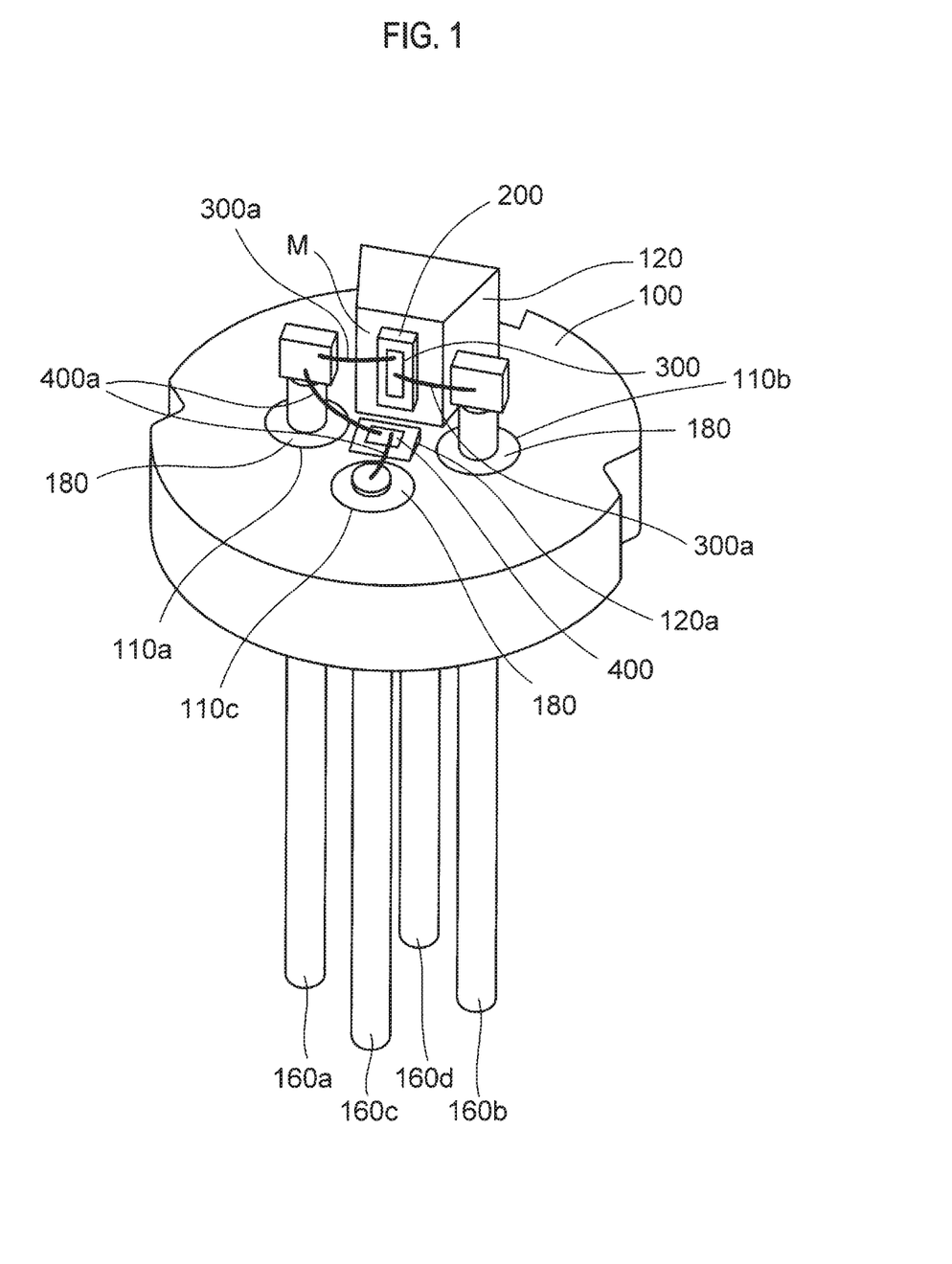
FIG. 1 is a perspective view explaining problems of an optical device header according to the preliminary matter.

Prior to explaining the present embodiment, the preliminary matter, which is the foundation thereof, will be described. As shown in FIG. 1, an optical device header according to the preliminary matter has an eyelet 100 and a heat dissipating portion 120 erected thereon. The eyelet 100 is provided with four, i.e., first to fourth, leads 160a, 160b, 160c and 160d.

The heat dissipating portion 120 arranged on the eyelet 100 has a mounted surface M, on which a semiconductor laser device is mounted. The eyelet 100 is provided with three, i.e., first to third through-holes 110a, 110b and 110c extending therethrough in a thickness direction thereof. Also, the first to third leads 160a to 160c are respectively sealed and fixed in the first to third through-holes 110a to 110c by glass 180.

On the mounted surface M of the heat dissipating portion 120, the semiconductor laser device 300 is mounted via a base 200. The semiconductor laser device 300 is connected to the first lead 160a and the second lead 160b by gold wires 300a.

Also, an inclined portion 120a is formed to protrude from a portion of the eyelet 100, which is located in front of the mounted surface M of the heat dissipating portion 120. A photo diode 400 is mounted on the inclined portion 120a via a base (not shown). The photo diode 400 is connected to the first lead 160a and the third lead 160c by gold wires 400a.

The photo diode 400 is configured to receive a monitoring light emitted from a lower portion of the semiconductor laser device 300 and to control an output of the semiconductor laser device 300.

Also, the fourth lead 160d is electrically connected to a lower surface of the eyelet 100 to serve as a common ground lead. In addition, the semiconductor laser device 300 and the photo diode 400 are electrically connected to the fourth lead 160d via the heat dissipating portion 120 and the eyelet 100 by wires or the like.

In the optical device header, it is necessary to adjust a characteristic impedance of a transmission path thereof in order to transmit high-speed signals, and typically, the characteristic impedance of the transmission path is set to 50Ω.

In order to set the characteristic impedance to have such a value, a length of each of the gold wires 300a for connecting the semiconductor laser device 300 to the first and second leads 160a and 160b has to be shortened to about 0.5 mm.

However, in the optical device header of FIG. 1, an arrangement pitch of the first to third leads 160a to 160c is limited to no less than 2 mm and thus it is difficult to arrange the first to third leads 160a to 160c to be further close to each other.

Also, considering a margin in layout of the heat dissipating portion 120 and the first to third leads 160a to 160c, it is difficult to narrow a distance between the mounted surface M of the heat dissipating portion 120 and the first and second leads 160a and 160b to less than that.

Accordingly, the length of each of the gold wires 300a for connecting the semiconductor laser device 300 to the first and second leads 160a and 160b in FIG. 1 is 1 mm or longer, thereby increasing a resistance component thereof.

Also, similarly, a length of each of the gold wires 400a for connecting the photo diode 400 to the first and third leads 160a and 160c is 1 mm or longer.

As described above, in the optical device header according to the preliminary matter, the length of each of the gold wires 300a for connecting the semiconductor laser device 300 to the first and second leads 160a and 160b is long due to the structure thereof, thereby increasing transmission loss of the transmission path.

In addition, the first to third lead pins 160a to 160c having such a long length exist in the optical device header, and thus the characteristic impedance of the corresponding part is increased to 300Ω or more.

As described above, in the optical device header according to the preliminary matter, there is a problem in that conformity in characteristic impedance of the entire transmission path cannot be achieved.

An optical device package according to an embodiment described below can solve the above problem.

Embodiment

Figure 2:
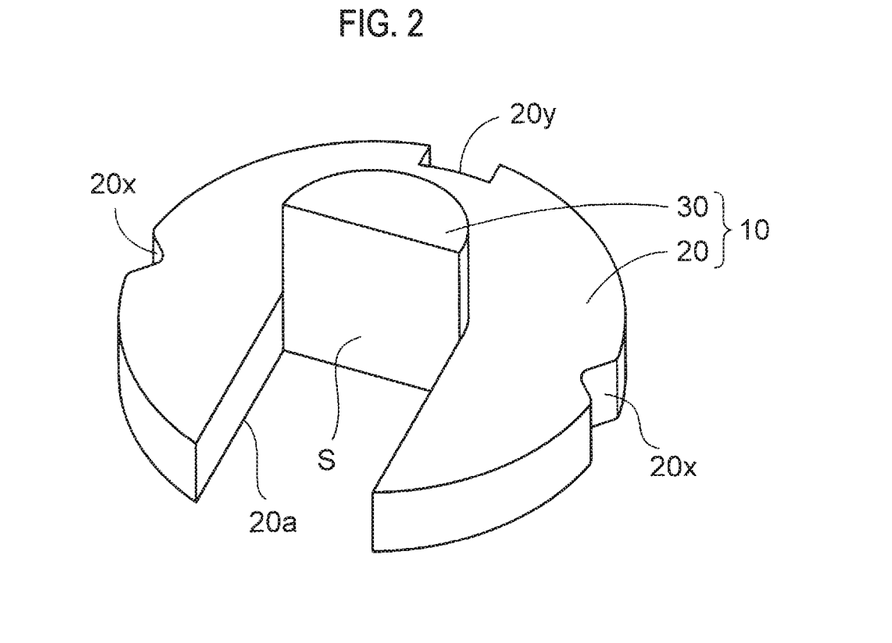
FIG. 2 is a perspective view showing a metal base body used in an optical device package according to an embodiment.

First, a metal base body used in the optical device package of the embodiment will be described. FIG. 2 is a perspective view showing the metal base body used in the optical device package of the embodiment.

As shown in FIG. 2, the metal base body 10 is constituted of an eyelet 20 and a protrusion 30 protruding upward from the center portion of an upper surface of the eyelet 20.

The eyelet 20 has a cutout portion 20a formed from an outer circumferential surface of a circular disk-shaped metal plate toward the center portion thereof. The cutout portion 20a is formed in a rectangular shape, for example, as viewed in a plan view. Also, the cutout portion 20a is formed to extend through the eyelet 20 from an upper surface to a lower surface thereof.

Also, the protrusion 30 is erected on an end side of the cutout portion 20a of the eyelet 20. The cutout portion 20a of the eyelet 20 has a connection surface S on the inner end thereof. The connection surface S is formed as a vertical surface perpendicular to a surface of the eyelet 20. As described below, the connection surface S of the cutout portion 20a of the eyelet 20 is connected with a wiring board.

A pair of triangular positioning notches 20x and a triangular orientation notch 20y are provided on the outer circumference of the eyelet 20.

The metal base body 10 is manufactured by integrally shaping a metal member by means of pressing using a mold. As a material of the metal base body 10, iron or copper is preferably used.

Further, on the entire outer surface of the metal base body 10, nickel (Ni)/gold (Au) plating layers (not shown) are formed in this order from below. The nickel/gold plating layers are formed by electrolytic plating.

Figure 3:
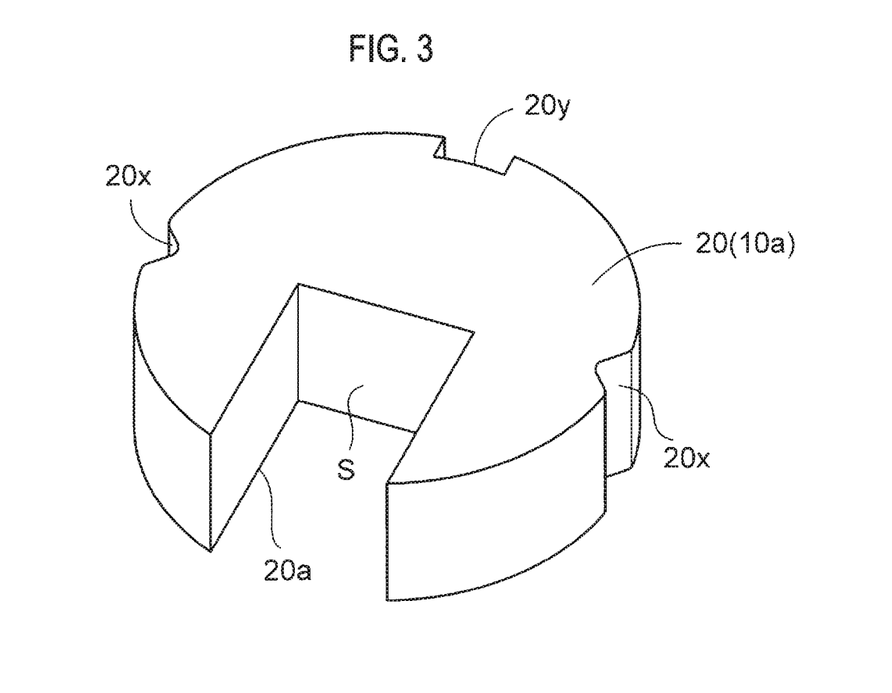
FIG. 3 is a perspective view showing a variant of the metal base body used in the optical device package according to the embodiment.

In FIG. 3, a metal base body 10a according to a variant of the embodiment is shown. As in the variant of FIG. 3, the protrusion 30 of FIG. 2 may be omitted and thus the metal base body 10a may be merely constituted of a circular disk-shaped eyelet 20. In this case, a connection surface S is similarly arranged on an inner end of a cutout portion 20a of the eyelet 20.

In a case where the protrusion 30 is omitted as in FIG. 3, a thickness of the eyelet 20 of FIG. 3 is set to be thicker than a thickness of the eyelet 20 of FIG. 2 in consideration of heat dissipating ability.

In this way, it is preferable that the cutout portion 20a is formed from the outer circumferential surface of the eyelet 20 toward the center portion thereof and also the connection surface S is arranged on the side wall of the end of the cutout portion 20a.

As described above, the metal base body 10 in which the cutout portion 20a is formed from the outer circumferential surface toward the center portion and the side wall of the cutout portion 20a serves as the connection surface S is prepared.

Figure 4A:
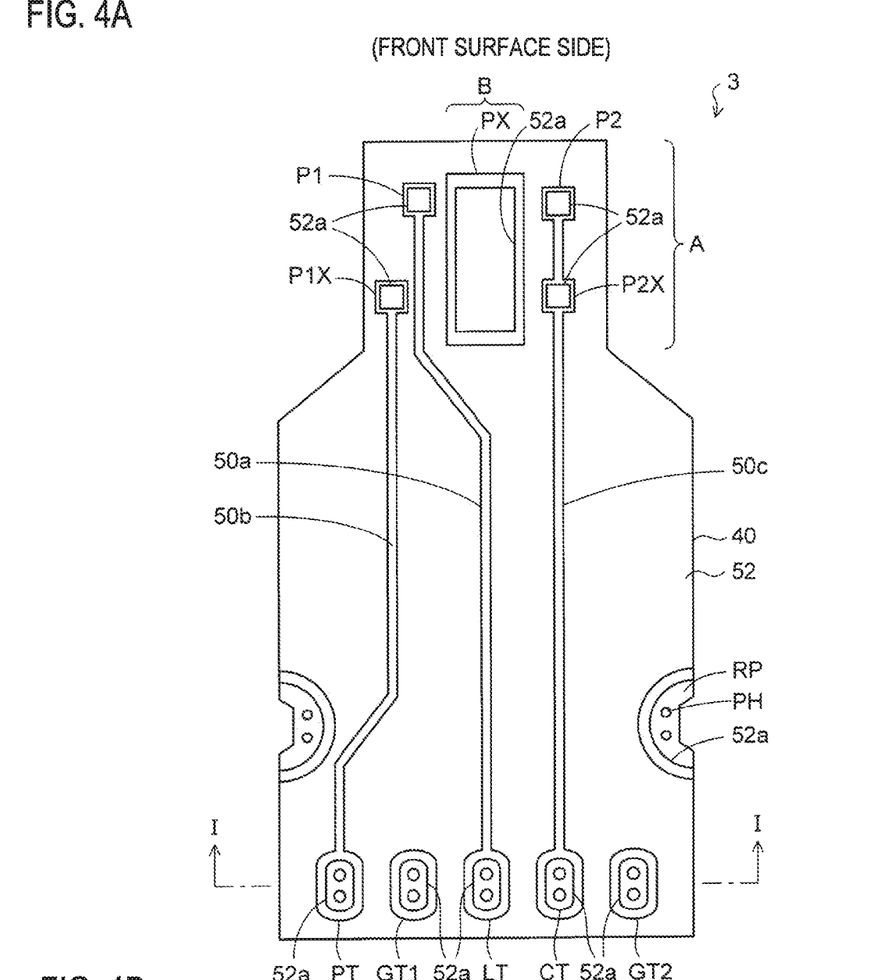
FIG. 4A is a plan view of a wiring board used in the optical device package according to the embodiment, as viewed from the front surface side thereof.
Figure 4B:
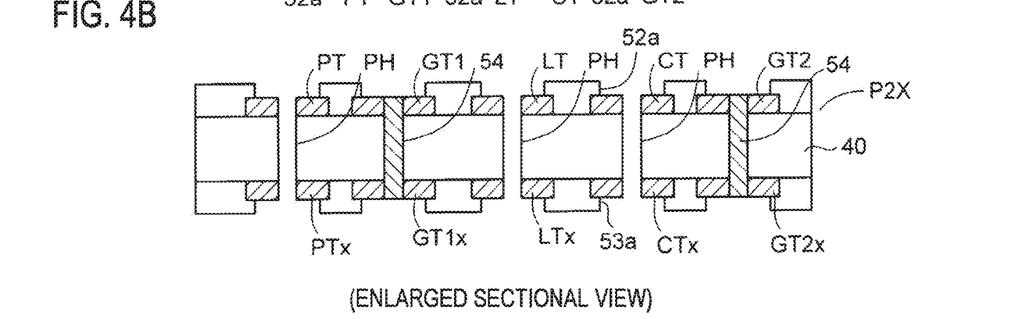
FIG. 4B is an enlarged sectional view taken along a line I-I in the plan view of FIG. 4A.

Next, the wiring board used in the optical device package of the embodiment will be described. FIG. 4A is a plan view of the wiring board used in the optical device package, as viewed from the front surface side thereof and FIG. 4B is an enlarged sectional view taken along a line I-I in the plan view of FIG. 4A.

First, a structure of a front surface of the wiring board will be described. As shown in FIG. 4A, the wiring board 3 has a substrate 40. The substrate 40 is formed of a polyimide film having a thickness of about 50 μm and is flexible. Alternatively, depending on applications, a rigid substrate, which is formed of a glass epoxy resin or the like and thus is rigid, may be employed as the substrate 40.

The substrate 40 has such a shape that as viewed in a plan view, a narrow portion A having a narrower width is connected to an one end side of a rectangular body. On the front surface of the wiring board 3, the center portion of the narrow portion A on the one end side of the substrate 40 is an optical device mounting region B for mounting optical devices. Also, an optical device mounting pad PX having a rectangular shape is formed in the optical device mounting region B.

As the optical devices, a semiconductor laser device is employed as a light emitting device and a photo diode is employed as a light receiving element. In the following descriptions of pads, connection terminals and the like, the semiconductor laser device is designated as 'LD' and the photo diode is designated as 'PD'. Also, in FIG. 4A, each element is depicted in a see through manner.

On a portion of the substrate 40 which corresponds to a left region of the optical device mounting pad PX, a first LD pad P1 and a first PD pad P1X are formed.

The first LD pad P1 is connected with a first wiring layer 50a extending to a lower end of the substrate 40, and a LD connection terminal LT is formed to be connected to an end of the first wiring layer 50a.

Also, the first PD pad P1X is connected with a second wiring layer 50b extending to the lower end of the substrate 40, and a PD connection terminal PT is formed to be connected to an end of the second wiring layer 50b.

Further, on a portion of the substrate 40 which corresponds to a right region of the optical device mounting pad PX, a second LD pad P2 and a second PD pad P2X are formed.

The second LD pad P2 and the second PD pad P2X are connected with a third wiring layer 50c extending to the lower end of the substrate 40, and a LD/PD common connection terminal CT is formed to be connected to an end of the third wiring layer 50c.

A first ground connection terminal GT1 is formed in a region between the PD connection terminal PT and the LD connection terminal LT. Also, a second ground connection terminal GT2 is formed in a region on the right side of the LD/PD common connection terminal CT.

The optical device mounting pad PX, first to third wiring layers 50a to 50c, pads and connection terminals as described above are formed by patterning an electrolytic copper foil, which is bonded on the front surface of the substrate 40 with adhesive, by means of photolithography and wet etching. In this way, the optical device mounting pad PX, first to third wiring layers 50a to 50c, pads and connection terminals are formed as the same layer.

A thickness of the electrolytic copper foil is for example about 18 μm and the electrolytic copper foil can be finely processed to provide wiring widths, which can achieve conformity in characteristic impedance.

Thus, each of distances between the optical device mounting pad PX and the first and second LD pads P1 and P2 and first and second PD pads P1X and P2X can be narrowed to the limits of the photolithography technique.

Also, on the substrate 40, a solder resist layer 52 is formed to have openings 52a provided above the optical device mounting pad PX, each pad and each connection terminal. Also, nickel (Ni)/gold (Au) plating layers (not shown) are formed in this order from below on surfaces of the optical device mounting pad PX, each pad and each connection terminal exposed through the openings 52a of the solder resist layer 52. The nickel/gold plating layers are formed by electrolytic plating.

Figure 5:
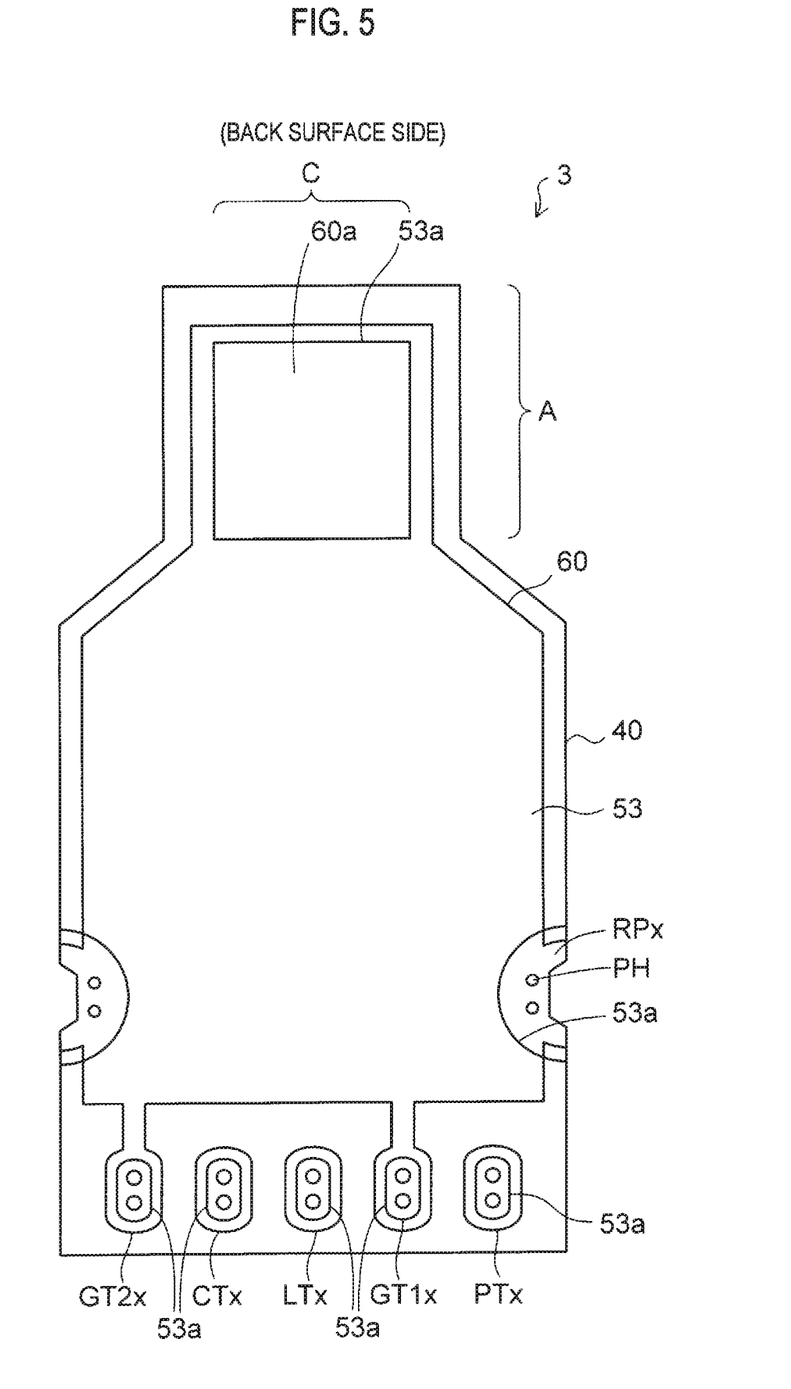
FIG. 5 is a plan view of the wiring board used in the optical device package according to the embodiment, as viewed from the back side.

Next, a structure of a back surface of the wiring board 3 will be described. As shown in FIG. 5, a region of the back surface corresponding to the optical device mounting region B on the front surface of the wiring board 3 is a connection region C. On the back surface side of the wiring board 3, a ground layer 60 is formed on the substrate 40. The ground layer 60 is a plane layer and is integrally formed with a main part on the back surface of the substrate 40.

Also, a PD connection terminal PTx is arranged in a region on the back surface of the substrate 40 corresponding to the PD connection terminal PT on the front surface side. In addition, first and second ground terminals GT1x and GT2x are respectively arranged in regions on the back surface of the substrate 40 corresponding to the first and second ground terminals GT1 and GT2 on the front surface side.

Further, a LD connection terminal LTx is arranged in a region on the back surface of the substrate 40 corresponding to the LB connection terminal LT on the front surface side.

Further, a LD/PD common connection terminal CTx is arranged in a region on the back surface of the substrate 40 corresponding to the LD/PD common connection terminal CT on the front surface side.

The ground layer 60 is connected to the first ground connection terminal GT1x and the second ground connection terminal GT2x formed on the back surface of the substrate 40.

Like the case of the front surface side, the ground layer 60 and each terminal on the back surface side of the substrate 40 are formed by patterning an electrolytic copper foil, which is bonded on the back surface of the substrate 40 with adhesive, by means of photolithography and wet etching.

In addition, on the back surface of the substrate 40, a solder resist layer 53 is formed to have openings 53a provided above the ground layer 60 in connection region C and each terminal as described above. In the connection region C, a connection portion 60a of the ground layer 60 is kept exposed through the respective opening 53a of the solder resist layer 53.

Additionally referring to the enlarged sectional view of FIG. 4B, the first ground connection terminal GT1 on the front surface side of the substrate 40 and the first ground connection terminal GT1x on the back surface side are connected to each other via a through-conductor 54 extending through the substrate 40.

Also, similarly, the second ground connection terminal GT2 on the front surface side of the substrate 40 and the second ground connection terminal GT2x on the back surface side are connected to each other via a through-conductor 54 extending through the substrate 40. The through-conductors 54 are formed by electrolytic copper plating layers or the like.

Further, a through-hole PH is formed to extend through the substrate 40 from an upper surface of the PD connection terminal PT on the front surface side to a lower surface of the PD connection terminal PTx on the back surface side and thus defines a cavity.

Also, similarly, a through-hole PH is formed to extend through the substrate 40 from an upper surface of the LD connection terminal LT on the front surface side to a lower surface of the connection terminal LTx on the back surface side and thus defines a cavity. Further, similarly, a through-hole PH is formed to extend through the substrate 40 from an upper surface of the LD/PD common connection terminal CT on the front surface side to a lower surface of the LD/PD common connection terminal CTx on the back surface side and thus defines a cavity.

Each connection terminal on the back surface side of the substrate 40 as described above is connected to a respective connection electrode of a mounting substrate by soldering. At this time, in the PD connection terminal PT, the LD connection terminal LT and the LD/PD common connection terminal CT, soldering connection is performed by supplying a solder to each connection terminal on the front surface side through the respective through-hole PH. Because the solder is flowed out onto each connection terminal on the front surface side through the respective through-hole PH, connection by the solder can be easily identified.

The PD connection terminal PT, the LD connection terminal LT and the LD/PD common connection terminal CT on the front surface side are examples of a first connection terminal on the front surface side. Also, the PD connection terminal PTx, the connection terminal LTx and the LD/PD common connection terminal CTx on the back surface side are examples of a second connection terminal on the back surface side.

Meanwhile, in ground lines, the first and second ground connection terminals GT1x and GT2x on the back surface side are connected to respective electrodes of the mounting substrate by soldering and also are connected to the first and second ground connection terminals GT1 and GT2 on the front surface side via through-conductors 54.

Further, referring to the plan view of the front surface side of the wiring board 3 of FIG. 4A, semicircular reinforcing pads RP are respectively formed on both ends of the substrate 40 located above one end region thereof where the connection terminals are arranged side by side. The reinforcing pads RP on the front surface side are formed as the same layer as the first to third wiring layers 50a to 50c and are arranged to be separated from the first to third wiring layers 50a to 50c.

Also, as shown in FIG. 5, reinforcing pads RPx are arranged in regions of the back surface of the substrate 40 corresponding to the reinforcing pads RP on the front surface side of the substrate 40. The reinforcing pads RPx on the back surface side are formed as the same layer as the ground layer 60 and are connected to the ground layer 60. Alternatively, the reinforcing pads RPx on the back surface side of the substrate 40 may be separated from the ground layer 60.

Also, like the LD connection terminal LT and the like of FIG. 4B as described above, through-holes PH are formed to extend through the substrate 40 from upper surfaces of the reinforcing pads RP on the front surface side to lower surfaces of the reinforcing pads RPx on the back surface side.

The solder resist layers 52 and 52 on the front and back surface sides of the substrate 40 are respectively formed so that openings 52a and 53a are also arranged above the reinforcing pads RP and RPx.

Each connection terminal on the back surface side of the substrate 40 as described above is connected to the mounting substrate by soldering in a state where the substrate 40 is bent at the vicinity thereof. At this time, the reinforcing pads RPx on the back surface side of the wiring board 3 are simultaneously fixed to members or the like at a periphery of the mounting substrate by soldering, thereby enhancing reliability of connection between each connection terminal of the wiring board 3 and the mounting substrate.

Now, methods of constructing the optical device package and the optical device apparatus using the metal base body of FIG. 2 and the wiring board 3 of FIG. 4A as described above will be described.

Figure 6:
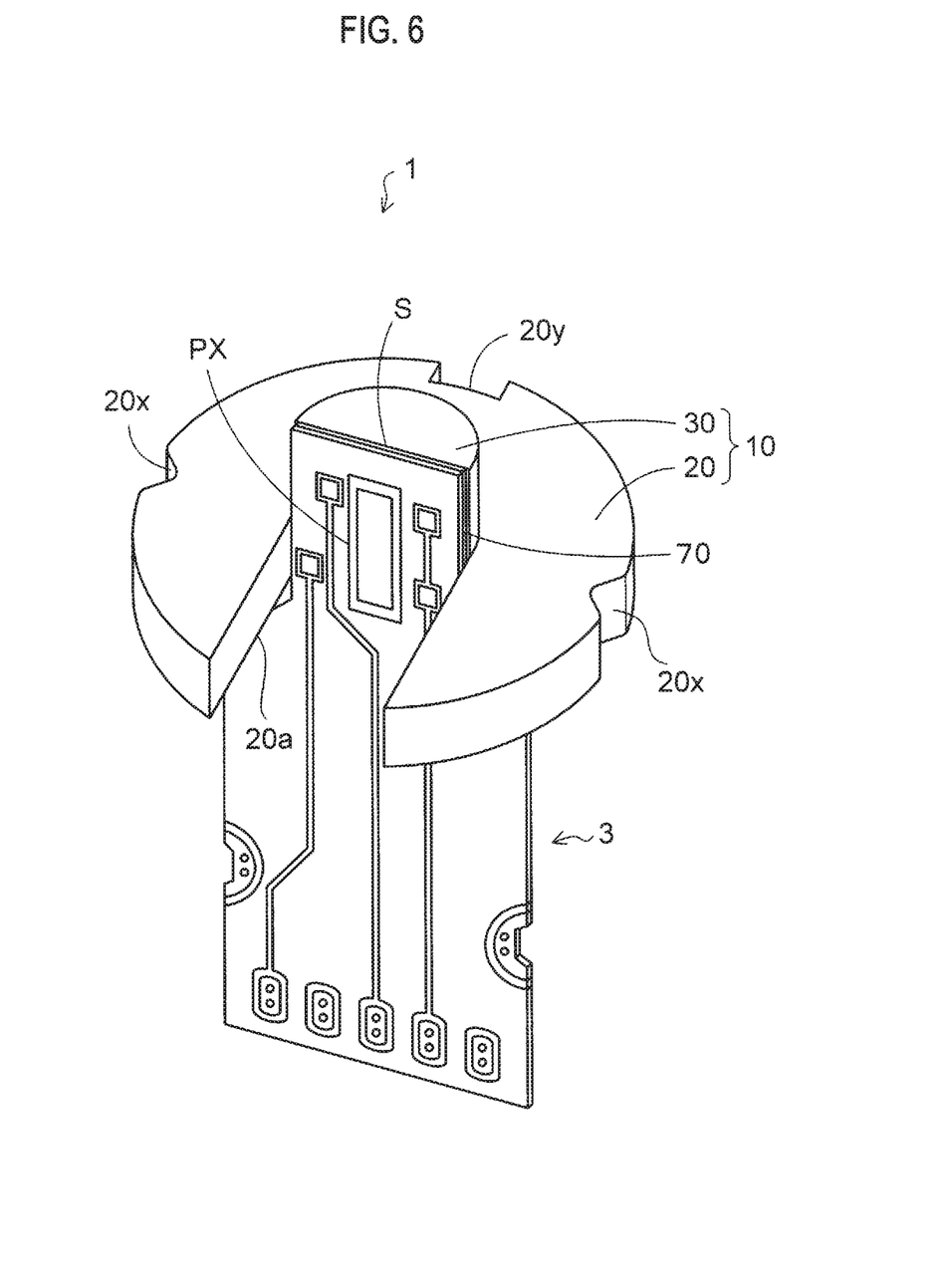
FIG. 6 is a perspective view showing the optical device package according to the embodiment.

As shown in FIG. 6, the connection portion 60a of the ground layer 60 on the back surface side of the wiring board 3 of FIGS. 4A and 5 is connected to the connection surface S of the metal base body 10 of FIG. 2 by a conductive bonding material 70. As the conductive bonding material 70, solders, metal brazing materials, conductive pastes such as silver paste, and the like can be employed.

Thus, the metal base body 10 and the ground layer 60 on the back surface of the wiring board 3 are electrically connected to each other, so that the metal base body 10 also has a ground function.

In the way, the optical device package 1 of the embodiment is obtained. As shown in FIG. 6, the optical device package 1 of the embodiment is configured so that as described above, the connection portion 60a of the ground layer 60 on the back surface side of the wiring board 3 of FIGS. 4A and 5 is connected to the connection surface S of the metal base body 10 of FIG. 2 by the conductive bonding material 70.

Additionally referring to FIG. 4A, the optical device mounting region B is provided on the front surface side of the wiring board located inside the cutout portion 20a of the metal base body 10. A center portion of a region of the front surface of the wiring board 3 corresponding to the connection surface S of the metal base body 10 is the optical device mounting region B. Also, the optical device mounting pad PX is arranged in the optical device mounting region B on the front surface side of the wiring board 3.

In addition, the wiring board 3 has the first LD pad P1, first PD pad P1X, second LD pad P2 and second PD pad P2X arranged outside the optical device mounting region B.

Figure 7:
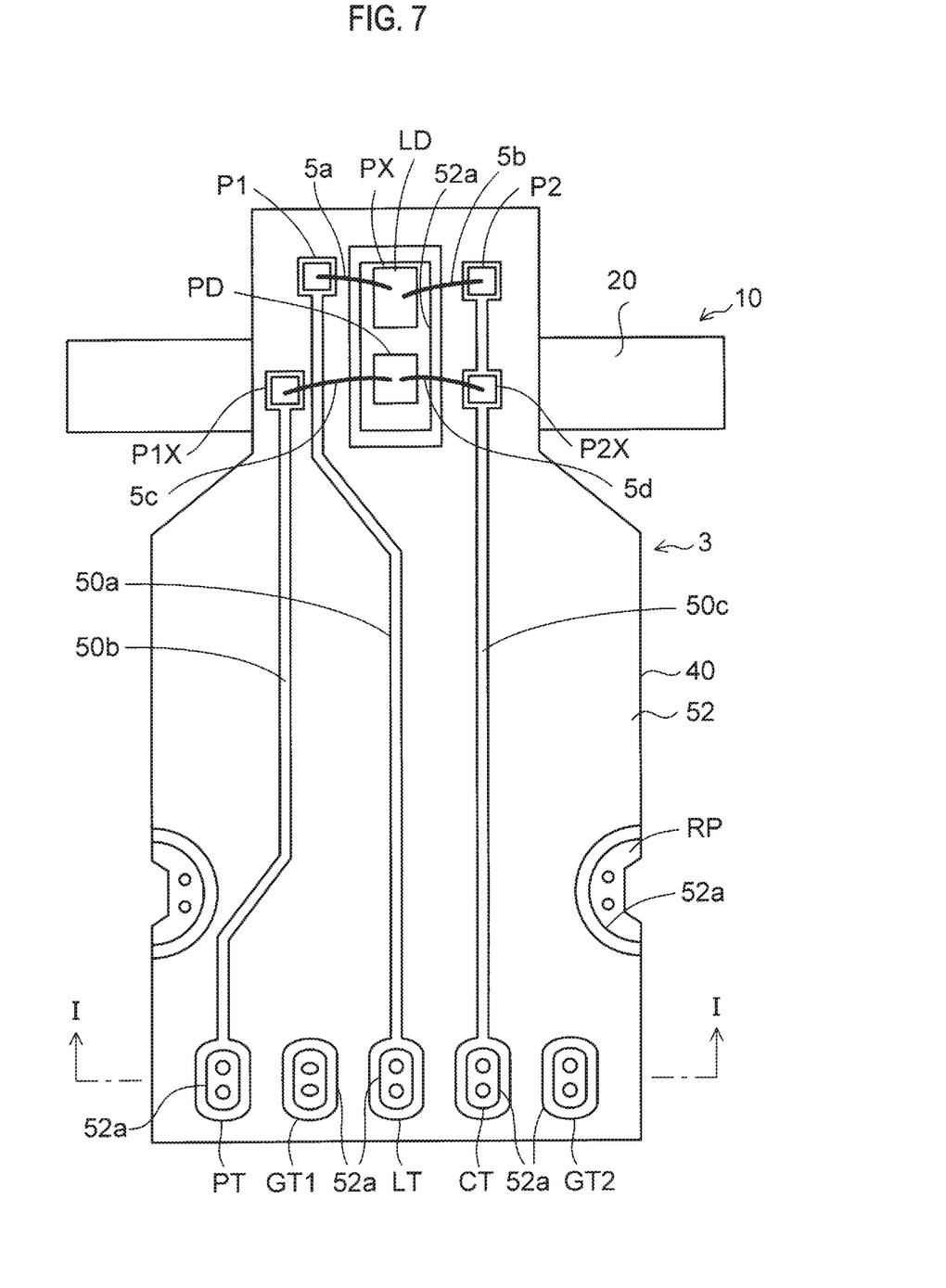
FIG. 7 is a perspective view showing an optical device apparatus according to the embodiment.

Also, as shown in a front view of FIG. 7, the semiconductor laser device LD is fixed and mounted on an upper portion of the optical device mounting pad PX of the wiring board 3 by means of a die attach material and the photo diode PD is similarly mounted on a lower portion thereof.

Also, the semiconductor laser device LD and the first LD pad P1 are connected to each other with a gold wire 5a formed by a wire bonding method. Further, the semiconductor laser device LD and the second LD pad P2 are connected to each other with a gold wire 5b.

In addition, the photo diode PD and the first PD pad P1X are connected to each other with a gold wire 5c. Further, the photo diode PD and the second PD pad P2X are connected to each other with a gold wire 5d.

As described above, the optical device mounting pad PX and each of the pads for the semiconductor laser device LD and photo diode PD are formed on the basis of photolithography. Accordingly, the optical device mounting pad PX and each of the pads for the semiconductor laser device LD and photo diode PD can be arranged to be sufficiently close to each other.

Thus, the gold wires 5a to 5d for connecting each of the pads to the semiconductor laser device LD and photo diode PD can have a shorted length of about 0.5 mm or less, thereby reducing transmission loss in the transmission path.

Also, in contrast to the optical device header according to the preliminary matter as described above, lead pins having a long length do not exist in the metal base body and thus parts which cause the characteristic impedance to be increased do not also exist therein, thereby allowing conformity in characteristic impedance to be easily achieved.

The inventor has found through a simulation that in a case of a frequency of 10 GHz, if each element of the wiring board 3 of FIGS. 4A and 5 is set to have the following specifications, the characteristic impedance becomes 50Ω.

Micro-strip lines in which the wiring layers 50a to 50c are formed on the upper surface of the substrate 40 (polyimide) and the ground layer 60 is formed on the lower surface of the substrate 40 are provided.

Wiring width of the wiring layers 50a to 50c: 0.105 min
Thickness of the wiring layers 50a to 50c: 0.018 mm
Thickness of the substrate 40 (polyimide (dielectric constant: 3.5): 0.050 mm
Thickness of the ground layer 60 (copper): 0.018 mm Thus, conformity in characteristic impedance of the entire transmission path can be achieved. Therefore, the optical device package can be applied to transmission of electric signals at a higher speed and also to optical communication applications having a large capacity of 10 Gbps or more.

In the foregoing embodiment, the semiconductor laser device LD and the photo diode PD are mounted on the optical device mounting pad PX formed in the optical device mounting region B of the substrate 40. If the semiconductor laser device LD and the photo diode PD can be directly mounted on the substrate 40, the optical device mounting pad PX may be omitted.

Figure 8:
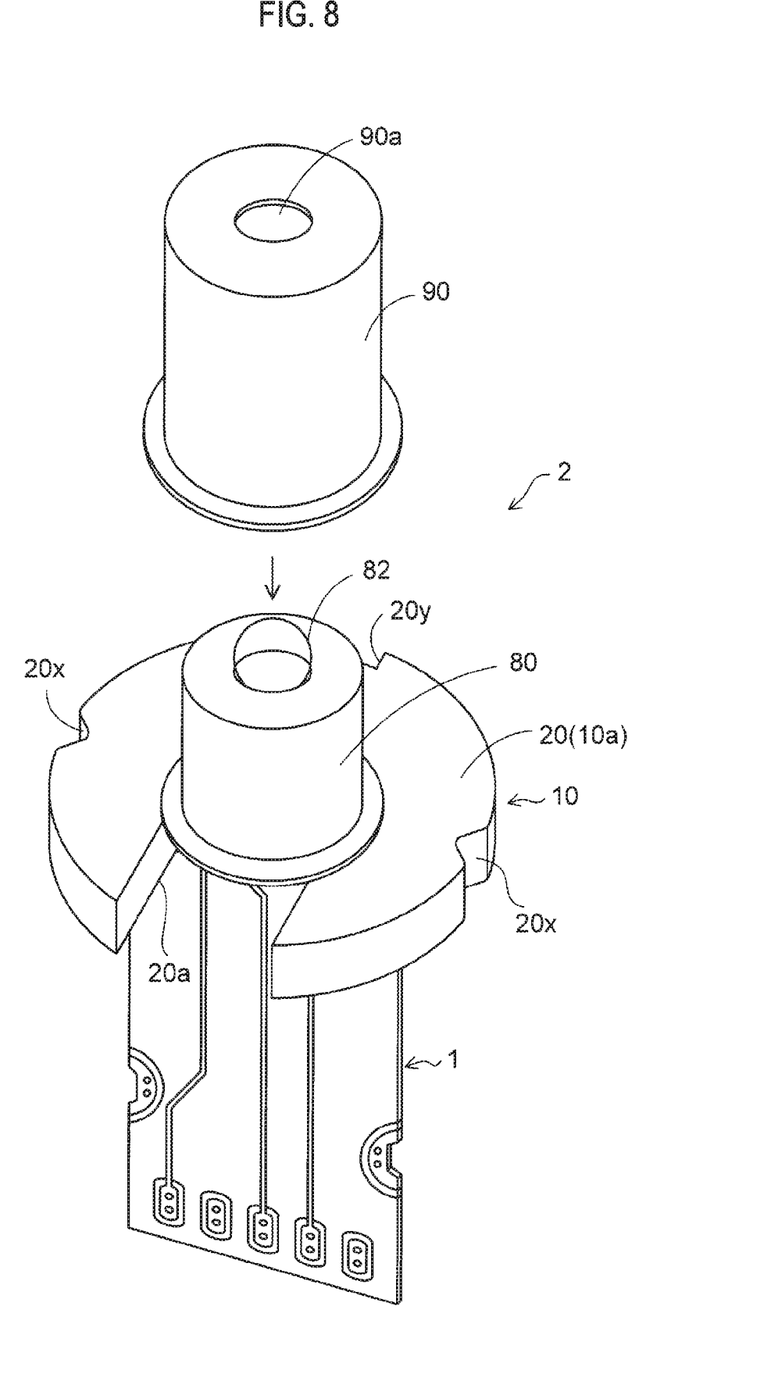
FIG. 8 is a perspective view showing an aspect where a lens cap and a fiber holder are attached on the optical device apparatus of FIG. 7.

As shown in FIG. 8, a lens cap 80 is attached on the metal base body 10 of the optical device package 1 of FIG. 7, in which the semiconductor laser device LD and the photo diode PD are mounted. A transparent ball lens 82 is mounted on a center portion of a distal end of the lens cap 80.

Further, as shown also in FIG. 8, a fiber holder 90 is attached on the lens cap 80. An opening 90a is provided in a center portion of a distal end of the fiber holder 90 to define a cavity.

In this way, the optical device apparatus 2 of the embodiment is manufactured.

Additionally referring to FIG. 7 as described above, the optical device apparatus 2 is configured so that electric signals are transmitted from the LD connection terminal LT of the wiring board 3 to the semiconductor laser device LD via the first wiring layer 50a, the first LD pad P1 and the gold wire 5a.

Thus, light is emitted upward from a light emitting portion of an upper end of the semiconductor laser device LD. The light emitted from the semiconductor laser device LD is focused by the transparent ball lens 82 of the lens cap 80 and then is transmitted to an external optical fiber through the opening 90a of the fiber holder 90.

At this time, a monitoring light emitted from a lower end of the semiconductor laser device LD enters a light receiving portion of the photo diode PD. In this way, the light emitted from the semiconductor laser device LD is monitored by the photo diode PD, so that an output of the semiconductor laser device LD can be controlled.

The optical device apparatus 2 is advantageous as compared with the optical device header according to the preliminary matter as described above in that a complicated process for sealing leads on through-holes of the metal base body with glass is eliminated and thus it is sufficient to connect the wiring board 3 to the connection surface S of the metal base body 10 having a simple structure.

Further, when the semiconductor laser device LD and the photo device PD are mounted, bases can be omitted.

Accordingly, the number of components can be reduced and also the assembling process can be simplified, thereby achieving reduction of manufacturing costs.

What is claimed is:

1. An optical device package, comprising:
    a metal base body comprising a cutout portion formed from an outer circumferential surface of the metal base body toward the center portion thereof; and
    a wiring board connected on a side surface of the cutout portion of the metal base body, the wiring board comprising an optical device mounting region provided on a portion of the wiring board located inside the cutout portion of the metal base body, and a pad arranged on a portion of the wiring board located outside the optical device mounting region.

2. The optical device package according to claim 1, wherein the wiring board comprises an optical device mounting pad which is arranged in the optical device mounting region and is formed of a same material as the pad.

3. The optical device package according to claim 1, wherein the wiring board comprises a ground layer formed on a back surface side of the wiring board, the back surface side being opposite to a front surface side where the pad is arranged, and
    wherein the ground layer is connected to the side surface of the cutout portion of the metal base body by a conductive bonding material.

4. The optical device package according to claim 1, wherein the pad of the wiring board is connected to a first connection terminal arranged on a front surface side via a wiring layer and a second connection terminal is arranged in a region on a back surface side of the wiring board corresponding to the first connection terminal,
    wherein a through-hole is formed to extend from the first connection terminal to the second connection terminal.

5. The optical device package according to claim 3, wherein the wiring board comprises a first ground connection terminal arranged on the front surface side and a second ground connection terminal arranged in a region on the back surface side corresponding to the first ground connection terminal;
    wherein the first ground connection terminal and the second ground connection terminal are connected to each other by a through-conductor extending through the wiring board, and the second ground connection terminal is connected to the ground layer.

6. The optical device package according to claim 1, wherein the wiring board comprises a substrate formed of a polyimide film and the pad is formed of a copper foil.

7. The optical device package according to claim 1, wherein the side surface of the cutout portion to which the wiring board is connected is an inner end of the cutout portion.

8. An optical device apparatus, comprising:
    an optical device package comprising:
        a metal base body including a cutout portion formed from an outer circumferential surface of the metal base body toward the center portion thereof, and
        a wiring board connected on a side surface of the cutout portion of the metal base body, the wiring board including an optical device mounting region provided on a portion of the wiring board located inside the cutout portion of the metal base body, and a pad arranged on a portion of the wiring board located outside the optical device mounting region;

an optical device mounted on the optical device mounting region of the wiring board of the optical device package; and a wire connecting the optical device to the pad.

9. The optical device apparatus according to claim 8, wherein the wiring board includes an optical device mounting pad which is arranged in the optical device mounting region (B) of the wiring board and is formed of a same material as the pad, and the optical device is mounted on the optical device mounting pad.

* * * * *